United States Patent
Trinh et al.

(10) Patent No.: US 12,002,077 B2
(45) Date of Patent: Jun. 4, 2024

(54) AUTOMATIC LISTING GENERATION FOR MULTIPLE ITEMS

(71) Applicant: eBay Inc., San Jose, CA (US)

(72) Inventors: Hoang Trinh, Mercer Island, WA (US); Huy Quang Nguyen, Bellevue, WA (US)

(73) Assignee: eBay Inc., San Jose, CA (US)

( * ) Notice: Subject to any disclaimer, the term of this patent is extended or adjusted under 35 U.S.C. 154(b) by 784 days.

(21) Appl. No.: 16/729,438

(22) Filed: Dec. 29, 2019

(65) Prior Publication Data

US 2021/0201373 A1 Jul. 1, 2021

(51) Int. Cl.
| | |
|---|---|
| *G06V 10/762* | (2022.01) |
| *G06F 3/0482* | (2013.01) |
| *G06F 16/55* | (2019.01) |
| *G06F 16/58* | (2019.01) |
| *G06F 18/22* | (2023.01) |
| *G06F 18/23* | (2023.01) |
| *G06Q 30/0601* | (2023.01) |
| *G06V 10/56* | (2022.01) |
| *G06V 10/74* | (2022.01) |

(Continued)

(52) U.S. Cl.
CPC ....... *G06Q 30/0603* (2013.01); *G06F 3/0482* (2013.01); *G06F 16/55* (2019.01); *G06F 16/5866* (2019.01); *G06F 18/22* (2023.01); *G06F 18/23* (2023.01); *G06V 10/56* (2022.01); *G06V 10/758* (2022.01); *G06V 10/761* (2022.01); *G06V 10/763* (2022.01); *G06V 10/764* (2022.01); *G06V 40/10* (2022.01); *G06V 40/20* (2022.01)

(58) Field of Classification Search
None
See application file for complete search history.

(56) References Cited

U.S. PATENT DOCUMENTS

| | | | |
|---|---|---|---|
| 9,875,303 B2 | 1/2018 | Atsmon et al. | |
| 10,769,502 B1 * | 9/2020 | Berg | G06F 16/53 |
| 2021/0048931 A1 * | 2/2021 | Barzelay | G06Q 30/0601 |

FOREIGN PATENT DOCUMENTS

WO WO-2020185226 A1 * 9/2020

OTHER PUBLICATIONS

Godin. "How to List Faster with eBay Bulk Listing Solution". https://crazylister.com/blog/ebay-bulk-listing-solution/. Jan. 28, 2018. (Year: 2018).*

(Continued)

*Primary Examiner* — Sean M Conner
(74) *Attorney, Agent, or Firm* — FIG. 1 Patents

(57) ABSTRACT

A machine is configured to automatically generate listings for multiple items. For example, the machine receives, from a client device, two or more images and two or more descriptions. The two or more images depict two or more items. The two or more descriptions pertain to the two or more items. The machine matches one or more images of the two or more images to a description of the two or more descriptions. The one or more images depict an item of the two or more items. The description pertains to the item. The machine, based on the matching, generates a listing of the item. The listing includes the one or more images depicting the item, and the description pertaining to the item. The machine causes display of the listing of the item in a user interface.

20 Claims, 8 Drawing Sheets

(51) Int. Cl.
    *G06V 10/75*     (2022.01)
    *G06V 10/764*     (2022.01)
    *G06V 40/10*     (2022.01)
    *G06V 40/20*     (2022.01)

(56) References Cited

OTHER PUBLICATIONS

Zhang, Ying, and Huchuan Lu. "Deep cross-modal projection learning for image-text matching." Proceedings of the European conference on computer vision (ECCV). 2018. (Year: 2018).*

Li, Xirong, et al. "Zero-shot image tagging by hierarchical semantic embedding." Proceedings of the 38th International ACM SIGIR Conference on Research and Development in Information Retrieval. 2015. (Year: 2015).*

More, "Product Matching in eCommerce Using Deep Learning", retrieved from the internet: <https://medium.com/walmartlabs/product-matching-in-ecommerce-4f19b6aebaca>, Sep. 12, 2017, 14 pages.

Tran et al., "Rich Image Captioning in the Wild", The IEEE Conference on Computer Vision and Pattern Recognition (CVPR) Workshops , Mar. 31, 2016 , pp. 49-56.

* cited by examiner

AUTOMATIC LISTING GENERATION FOR MULTIPLE ITEMS

TECHNICAL FIELD

Embodiments of the present disclosure relate generally to automatic generating of a collection of item listings based on automatic joint matching of images of items and of descriptions of the items.

BACKGROUND

It is common for sellers on e-commerce platforms to list multiple items for sale at one time in order to attempt to make good use of the sellers' time. A pattern may be observed among numerous sellers that shows that, when creating a plurality of listings for a plurality of items for sale, a seller uploads photos of an item and provides a textual description for the listing of the item. The seller then repeats this process for the other items while switching contexts between the online environment provided for uploading photographs and the online environment for providing textual descriptions of the items for sale. Thus, this process of listing a plurality of items for sale one-by-one is very user-interaction intensive and time consuming. In addition, the large number of user interactions increase the demand for data storage and diminish data processing speeds of the e-commerce operator's system.

BRIEF DESCRIPTION OF THE DRAWINGS

Various ones of the appended drawings merely illustrate example embodiments of the present disclosure and cannot be considered as limiting its scope.

Figure 1:
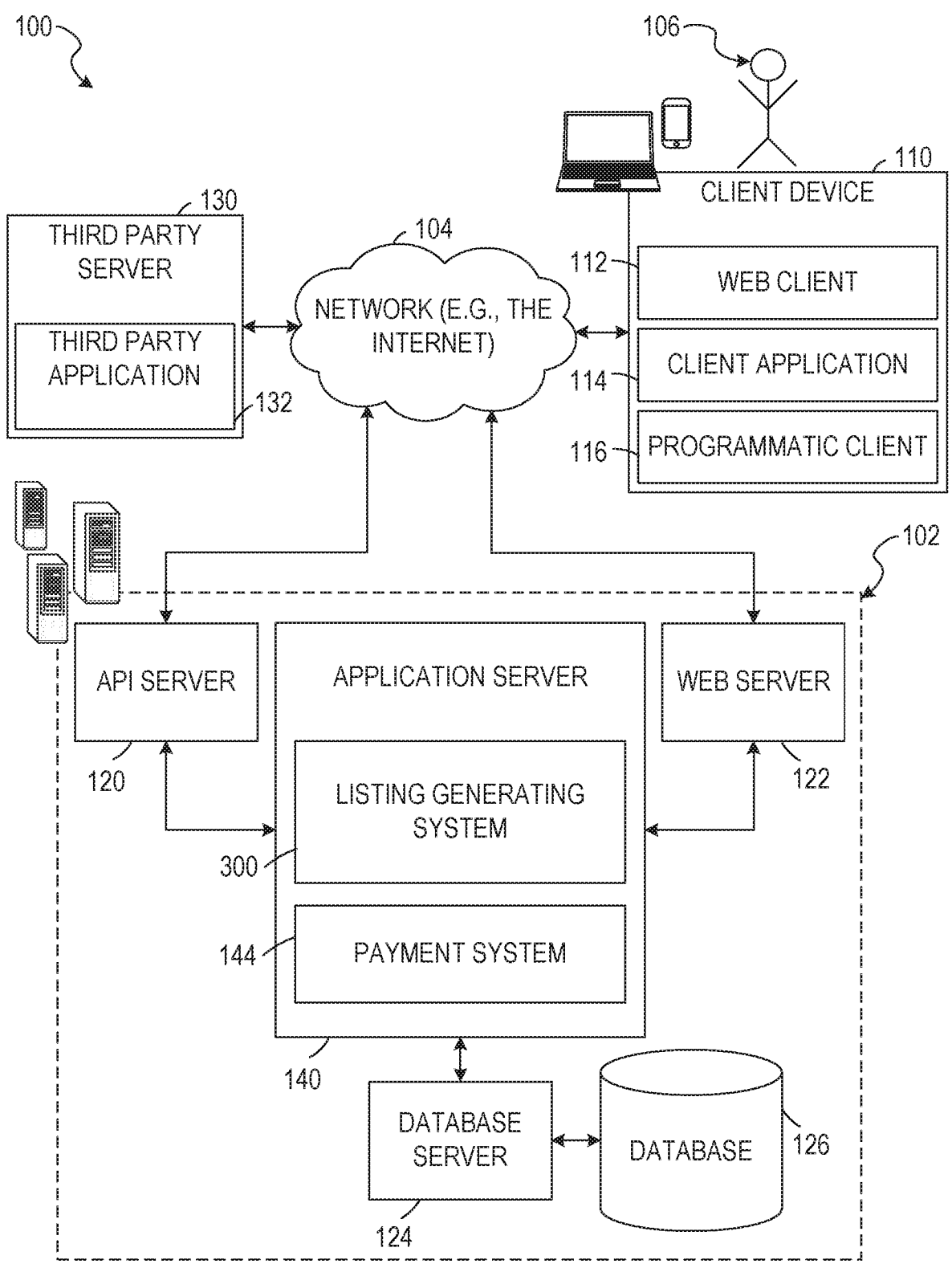
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well known instruction instances, protocols, structures, and techniques are not necessarily shown in detail.

Currently, users who wish to list multiple items for sale on an e-commerce site manually upload one or more images of an item to the e-commerce site and manually provide a description of the item, and then repeat these steps for each item for sale. This creates various system inefficiencies on the e-commerce operator's system that allows sellers to generate listings on the e-commerce platforms.

According to some example embodiments, a listing generating system provides a technical solution to the technical problems of increased demand for data storage and diminished data processing speeds faced by the e-commerce systems by automatically identifying images that depict a particular item from an input of a "bag of images" (e.g., a file of unlabeled images of various items), automatically matching the images that depict the item and a description of the item from an input of a "bag of descriptions" (e.g., a file of descriptions of the various items), and automatically generating a listing for the item using the matched images and description of the item.

In some example embodiments, the listing generating system utilizes the images of items as input to train one or more machine learning models to generate features that represent various aspects of particular images. Using the features and the machine learning models, the listing generating system can abstract the image into a feature vector (hereinafter also an "embedding" or a "vector") associated with the image. Then, the listing generating system, using a plurality of feature vectors associated with a plurality of images, identifies a number of images that are similar. The listing generating system then trains one or more machine learning models to classify similar images into a cluster of images. The classifying of similar images into a cluster of images may be based on identifying feature vectors that are similar. Two feature vectors may be similar if a computed distance value between the two feature vectors does not exceed (e.g., is equal to or is less than) a certain threshold value.

In machine learning, a feature is an individual measurable property or characteristic of a phenomenon being observed. In various example embodiments, using features in deep learning models to analyze and understand the input provided by the user not only enhances machine learning tools for input processing and understanding, but also improves data processing efficiency and data storage.

Deep learning refers to a class of techniques used to model a response by generating complex data transformations and abstractions using multi-layer neural networks. Deep learning can support a vast array of applications, ranging from response prediction, feature generation, natural language understanding, speech or image recognition, and understanding.

Finding similarities among images of items, and among the images and descriptions of the items is a complex problem, especially in a system where there could be large number of images and descriptions. In machine learning, categorical features are those features that may have a value from a finite set of possible values. In some example embodiments, categorical features include width, depth, height, and color. In some example embodiments, similarities may be identified by converting categorical values to vectors (a process referred to herein as "embedding") and then utilizing tools well-suited for operating on vectors. However, a simple vector definition where each value of the category is assigned a position within the vector results in very large vectors with very sparse values (e.g., a single 1 among 35,000 values). Because such vectors are difficult to work with, reducing the size of the vectors, in some instances, is important.

In some example embodiments, obtaining vectors with an embedded semantic meaning is important because similarity analysis is simplified using the embedded semantic meaning. For example, two vectors being close to each other indicates that the two vectors represent two categorical values that are similar.

A machine learning system may utilize embeddings to provide a lower-dimensional representation of different features, and can learn the embeddings along with the model parameters. In certain example embodiments, a deep learning model for response prediction is characterized using three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction.

For example, the input layer of a machine learning model used by the listing generating system accesses the input images and generates features that represent various aspects of the input images. One or more intermediate layers of the machine learning model may generate feature vectors that represent the input images using the features. The response layer may compute distance values for pairs of feature vectors, and output a "1" if two photos represented by the pair of feature vectors depict the same item, or "0" if the two photos depict different items. The machine learning model may further be trained using this input and output. The training may include penalization for wrong classification (e.g., information that a wrong classification occurred would propagate back to the embedding layer and cause it to change itself, and then generate a new feature vector so that the correct classification is made).

According to some example embodiments, the listing generating system receives, from a client device, two or more images and two or more descriptions. The two or more images depict two or more items, and the two or more descriptions pertain to the two or more items. The listing generating system matches one or more images of the two or more images to a description of the two or more descriptions. The one or more images depict an item of the two or more items. The description pertains to the item. Based on the matching, the listing generating system generates a listing of the item. The listing includes the one or more images depicting the item, and the description pertaining to the item. The listing generating system causes display of the listing of the item in a user interface of a client device associated with a seller. In some example embodiments, the user interface is enhanced to include user interface elements that facilitate the verification or confirmation of an automatically generated listing. In various example embodiments, a selection, by the user (e.g., the seller), of the one or more user interface elements of the user interface allows the user to edit or update the automatically generated listing with additional images or additional textual description.

Conventional user interfaces have many deficits relating to the efficient functioning of the computer, requiring a user of a conventional user interface to scroll around and switch views many times to find the right data associated with an item, especially when the conventional user interface is displayed on a small screen. Because small screens tend to need data and functionality divided into many layers or views, conventional user interfaces require users to drill down through many layers to get to desired data or functionality. That process can seem slow, complex, and difficult to learn, particularly to novice users. Further, that process decreases data processing speeds, and is often associated with higher data storage requirements.

In some example embodiments, a listing generating system that causes display of the listing of the item in a user interface of a client device associated with a seller improves conventional user interfaces by presenting an option to modify or add information to the automatically generated listing of an item. The providing of the option to interact (e.g., modify, improve, or supplement) with the automatically generated listing also enhances the efficiency of electronic devices by improving data processing speeds and data storage efficiency.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), a client application 114, and a programmatic client 116 executing on a client device 110.

The client device 110 may comprise, but is not limited to, mobile phones, desktop computers, laptops, portable digital assistants (PDAs), smart phones, tablets, ultra books, netbooks, multi-processor systems, microprocessor-based or programmable consumer electronics, game consoles, set-top boxes, wearable devices, smart watches, or any other communication devices that a user may utilize to access the networked system 102. In some embodiments, the client device 110 may comprise a display module to display information (e.g., in the form of user interfaces). In further embodiments, the client device 110 comprises one or more of a touch screens, accelerometers, gyroscopes, cameras, microphones, global positioning system (GPS) devices, and so forth. The client device 110 is a device of a user that can be used to provide a batch of unlabeled and unordered photographs of a number of items and a file (e.g., a spreadsheet) including unordered textual descriptions of the items as input to the listing generating system 300. In some example embodiments, the networked system 102 comprises a network-based marketplace (also referred to as "online marketplace") that responds to requests for product listings, publishes publications comprising item listings of products or services available on the network-based marketplace, and manages payments for these marketplace transactions. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., to access to a database of items available for sale, to authenticate a user, to verify a method of payment, etc.). Conversely, if the e-commerce site application is not included in the client device 110, the client device 110 uses its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host a listing generating system 300 and a payment system 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or databases 126. In an example embodiment, the databases 126 are storage devices that store information (e.g., publications, listings, digital content items, product descriptions, images of products, etc.) to be utilized by the listing generating system 300. The databases 126 may also store digital item information, in accordance with example embodiments.

Additionally, a third party application 132, executing on one or more third party servers 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The listing generating system 300 facilitates the receiving of a batch of unordered and unlabeled photographs of a number of items and of a file that includes unordered textual descriptions of the items, and the automatic generating of a collection of item listings based on automatic joint matching of images of items and of descriptions of the items. The listing generating system 300 also generates an enhanced user interface for facilitating the review of automatically generated listings. The payment system 144 provides a number of functions to perform or facilitate payments and transactions. While the listing generating system 300 and payment system 144 are shown in FIG. 1 to both form part of the networked system 102, it will be appreciated that, in alternative embodiments, each of the listing generating system 300 and payment system 144 may form part of a service that is separate and distinct from the networked system 102. In some embodiments, the payment system 144 may form part of the listing generating system 300.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The listing generating system 300 and payment system 144 could also be implemented as stand-alone software programs, which do not necessarily have networking capabilities.

The web client 112 accesses the listing generating system 300 or the payment system 144 via the web interface supported by the web server 122. Similarly, the programmatic client 116 accesses the various services and functions provided by the listing generating system 300 or the payment system 144 via the programmatic interface provided by the API server 120. The programmatic client 116 may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client 116 and the networked system 102.

Figure 2:
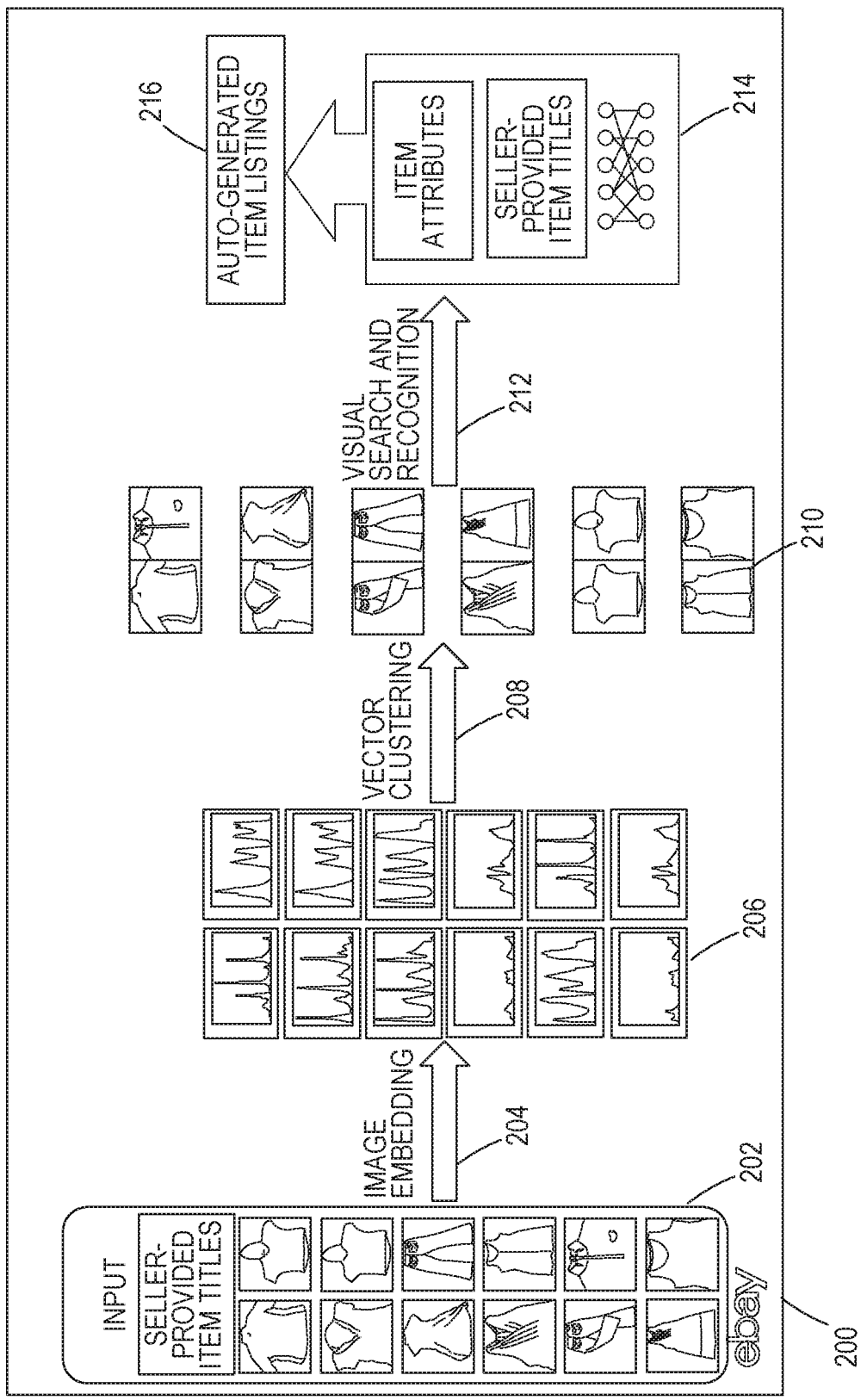
FIG. 2 illustrates a flow diagram that depicts a process of automatic generating of a collection of item listings based on automatic joint matching of images of items and of descriptions of the items, according to some example embodiments.

FIG. 2 illustrates a flow diagram 200 that depicts a process of automatic generating of a collection of item listings based on automatic joint matching of images of items and of descriptions of the items, according to some example embodiments.

As shown in FIG. 2, at operation 202, the listing generating system 300 accesses (e.g., receives or obtains) input provided by a seller of multiple items. The seller-provided input includes descriptions (e.g., titles) of the items for sale, and a set (e.g., a number) of unordered and unlabeled images (e.g., photographs) of the items for sale. The descriptions may be provided in a first file (e.g., a spreadsheet). The photographs may be provided in a second file. For example, as shown in FIG. 2, for a batch of six items for sale, the seller provides two photographs per item, and a spreadsheet with six lines, each line including the title of an item of the six items. A title may include various types of information describing the item, such as a category of the item, a brand of the item, a status (e.g., new or used) of the item, and characteristics of the item.

At operation 204, the listing generating system 300 performs image embedding of the images provided as input. Using image embedding techniques, the system generates, for each image, a feature vector that represents the image. Each of the resulting feature vector may be illustrated by a plotted color histogram (e.g., graph), as shown in area 206 of the flow diagram 200. The twelve plotted color histograms in area 206 provide visual displays of the feature vectors that represent the twelve images received as input from the seller. As shown in area 206 in FIG. 2, images that depict a particular item have similar histograms.

At operation 208, the listing generating system 300, based on the assumption that images of the same item look similar (e.g., share a number of attributes), clusters feature vectors that are similar into a group of vectors. A group of similar vectors identifies a group of similar images. In turn, a group of similar images identifies the same item.

To generate a cluster of vectors, the listing generating system 300 identifies two or more matching vectors from a plurality of vectors. In some example embodiments, the generating of the cluster of vectors includes forming pairs of vectors from the plurality of vectors, and, for each pair of vectors of the plurality of pairs of vectors, determining, using a distance function, a distance value between the vectors included in the pair. Based on determining that the distance value for a pair of vectors is equal to or less than a threshold value, the listing generating system 300 groups the vectors in the pair of vectors in a cluster of vectors. This process is repeated for all possible pairs of vectors that may be formed from the plurality of vectors representing the images provided as input. Accordingly, a cluster may include one or more vectors.

In some example embodiments, the listing generating system 300 also generates clusters of images based on the generated clusters of vectors. For example, area 210 of the flow diagram 200 illustrates six clusters of images, each cluster of images representing a particular item for sale by the seller.

At operation 212, the listing generating system 300, using visual search and recognition techniques, extracts attributes values from the images included in the various clusters of images. The listing generating system 300 can train computer models to recognize various types of clothing (e.g., jeans) and to output a set of keywords based on analysis of an image.

At operation 214, the listing generating system 300 matches the image clusters to corresponding titles that describe particular items based on the attribute values extracted from the image clusters and keywords extracted from the titles.

As discussed above, the attribute values are determined based on analyzing the images using computer visual search and recognition techniques. The keywords included in a title may be extracted using Natural Language Processing (NLP) techniques. For example, if a title states "iPhone 8 64 GB Black New," then the system, using an NLP algorithm, performs named-entity recognition and determines that "iPhone 8" is the name of the item, "64 GB" is the capacity of the item, "Black" is the color of the item, and "New" is the status of the item.

In some examples, the matching includes keyword matching. In some example embodiments, the matching includes vector matching.

In some example embodiments, to match the attribute value extracted from the image clusters and the keywords extracted from the titles, the listing generating system 300 executes instructions based on a joint matching algorithm that uses NLP techniques and max-weight bipartite matching to match each image group to an item title provided by the seller.

The joint matching may include: using a word vectorization technique (e.g., word2vec or Glove), converting each set of attribute values associated with a cluster into a vector. In some instances, the attribute values include words. A word2vec model is an embedding model trained to generate similar vector representations for similar words. The listing generating system 300 converts each word to a vector. The listing generating system 300 then computes a single vector to represent a set of words by combining the word vectors together (e.g., by using the mean vector, or by computing the column-wise min and max vectors from all the word vectors, then concatenating these two vectors into one). Similarly, the listing generating system 300 utilizes the same word vectorization technique to convert the item title to a vector. The result is N image-originated vectors and N title-originated vectors. The listing generating system 300, based on the N image-originated vectors and N title-originated vectors, computes N×N pairwise similarity scores between each pair of vectors (e.g., one vector from N image-originated vectors and one vector from N title-originated vectors). The goal of a bipartite matching algorithm is to find a joint match that optimizes the combined matching score of the N×N vector pairs, so that each image-originated vector is matched to one and only one title-originated vector. The highest pairwise similarity score identifies the best image-title match for a particular item.

At operation 216, the listing generating system 300 automatically generates item listings based on the automatically identified matches between image clusters and titles. The listing generating system 300 may include the automatically identified attribute values as keywords in the item listings to describe various aspects of the items for sale.

In some example embodiments, the automatically generated item listings are presented as a draft in a user interface of a client device of the seller. The seller may modify the automatically generated listing using one or more user interface elements included in the user interface for facilitating editing of the automatically generated listings.

Figure 3:
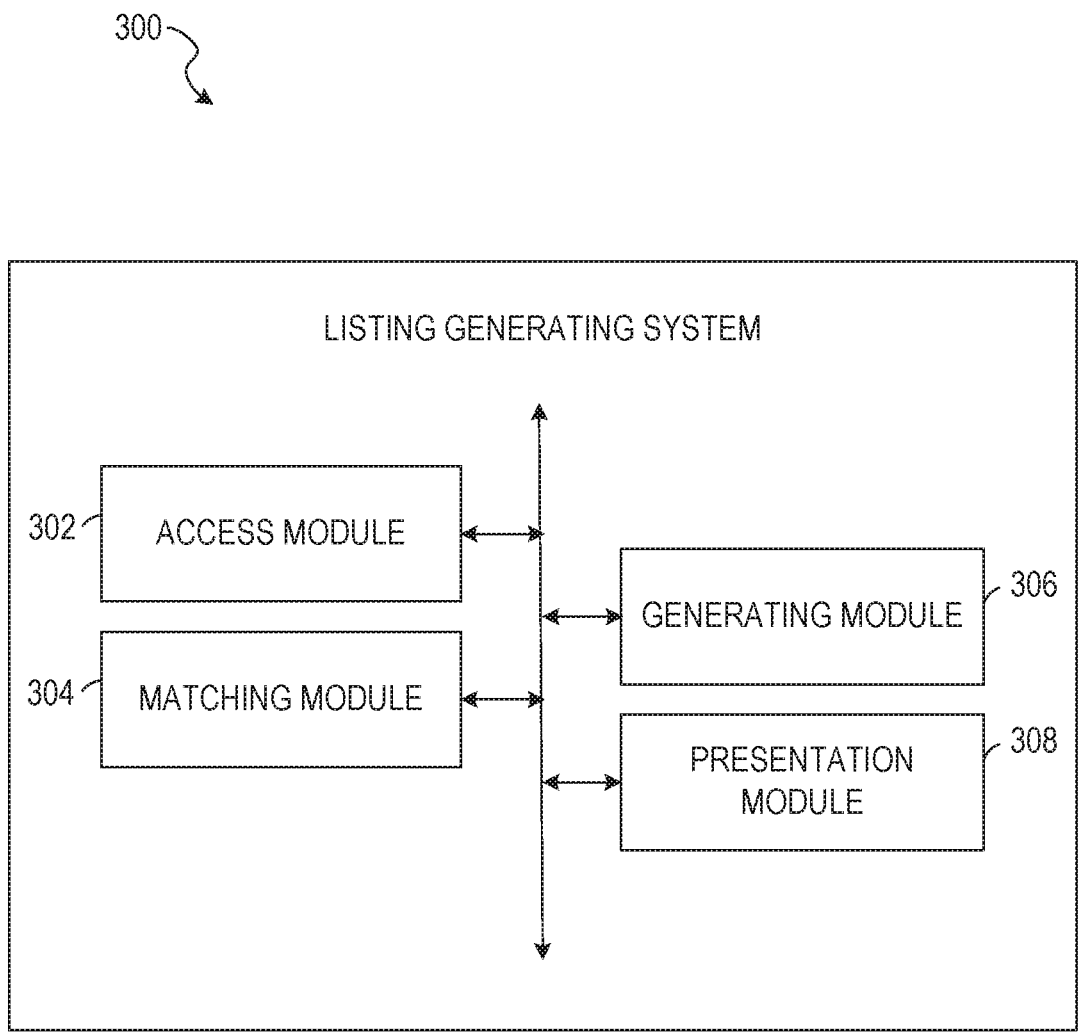
FIG. 3 is a block diagram illustrating components of a listing generating system, according to some example embodiments.

FIG. 3 is a block diagram illustrating components of the listing generating system 300, according to some example embodiments. As shown in FIG. 3, the listing generating system 300 includes an access module 302, a matching module 304, a generating module 306, and a presentation module 308, all configured to communicate with each other (e.g., via a bus, shared memory, or a switch).

According to some example embodiments, the access module 302 receives (e.g., accesses, obtains, or is provided) two or more images and two or more descriptions. In some example embodiments, the two or more images and the two or more descriptions are received from a client device associated with a seller of items. In some example embodiments, the two or more images, and the two or more descriptions are accessed from a record of a database.

The two or more images depict two or more items. The two or more descriptions pertain to the two or more items. In some example embodiments, one or more images of the two or more images depict a particular item. For example, two photographs of three photographs depict a red t-shirt, while the third photograph depicts a green t-shirt.

In some example embodiments, the two or more images depicting the two or more items are unlabeled, unordered, and included in a file. In various example embodiments, the two or more descriptions pertaining to the two or more items are unlabeled and included in a file (e.g., a spreadsheet).

The matching module 304 matches one or more images of the two or more images to a description of the two or more descriptions. The one or more images depict an item of the two or more items. The description pertains to the item.

The generating module 306, based on the matching, generates a listing of the item. The listing includes the one or more images depicting the item. The listing also includes the description pertaining to the item. In some example embodiments, the listing is generated, by the generating module 306, according to a template that delineates (e.g., provides or specifies) what a listing should look like. The template, in some instances, specifies various parameters (e.g., location, height, width, depth, color, background, font, or sound) associated with one or more components or areas of the automatically generated listing.

The presentation module 308 causes display of the listing of the item in a user interface. The user interface is enhanced to include user interface elements that facilitate, in some instances, the verification or confirmation of an automatically generated listing. In some example embodiments, a selection, by the user, of the one or more user interface elements of the user interface allows the user to edit or update the automatically generated listing with additional images or additional textual description.

To perform one or more of its functionalities, the listing generating system 300 communicates with one or more other systems. For example, an integration engine (not shown) may integrate the listing generating system 300 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources to allow information to be passed between the applications and to allow the applications to share and access common data. Furthermore, the modules may access database 126.

Figure 4:
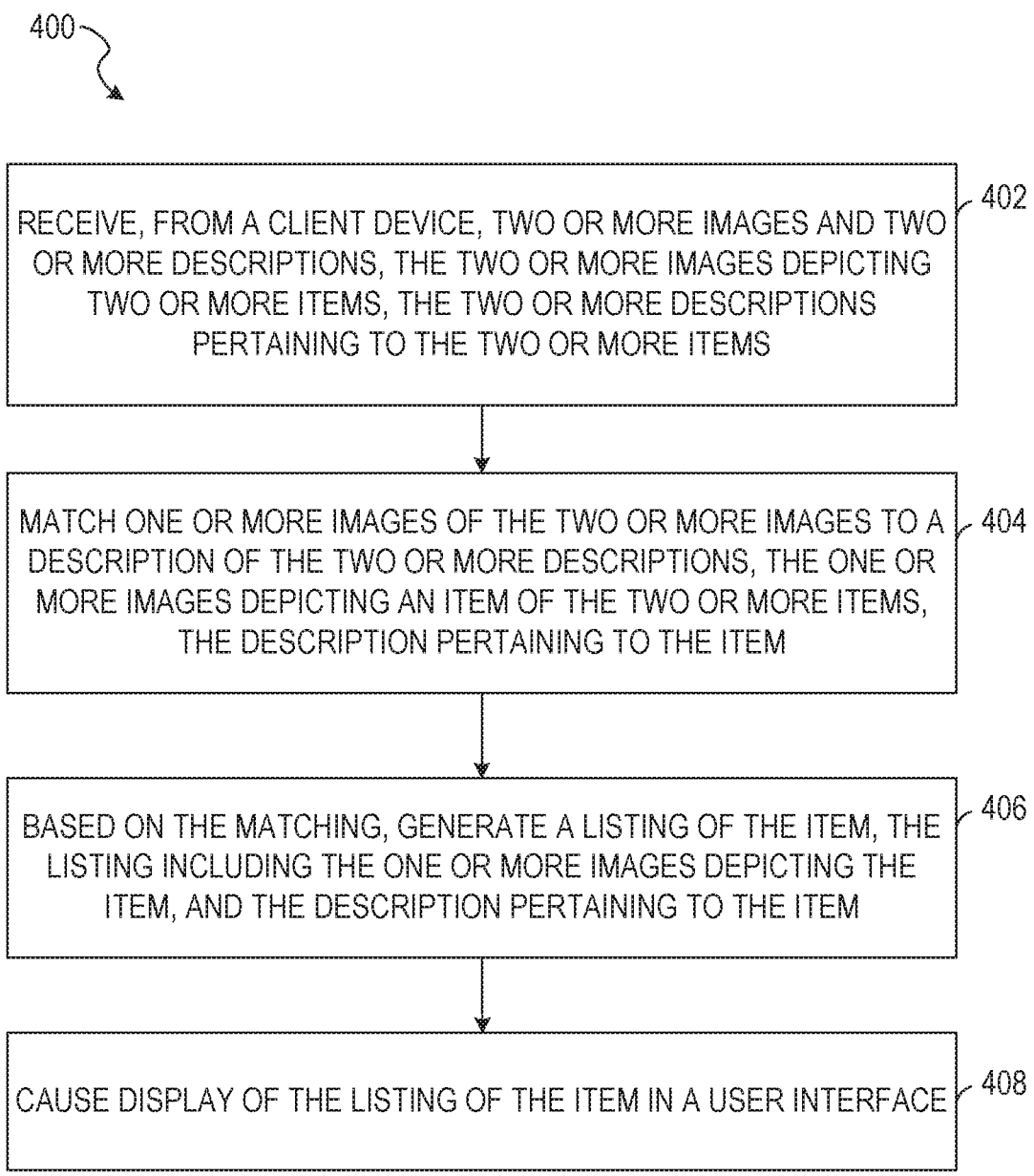
FIG. 4 is a flow diagram illustrating a method for automatically generating a collection of item listings, according to some example embodiments.
Figure 5:
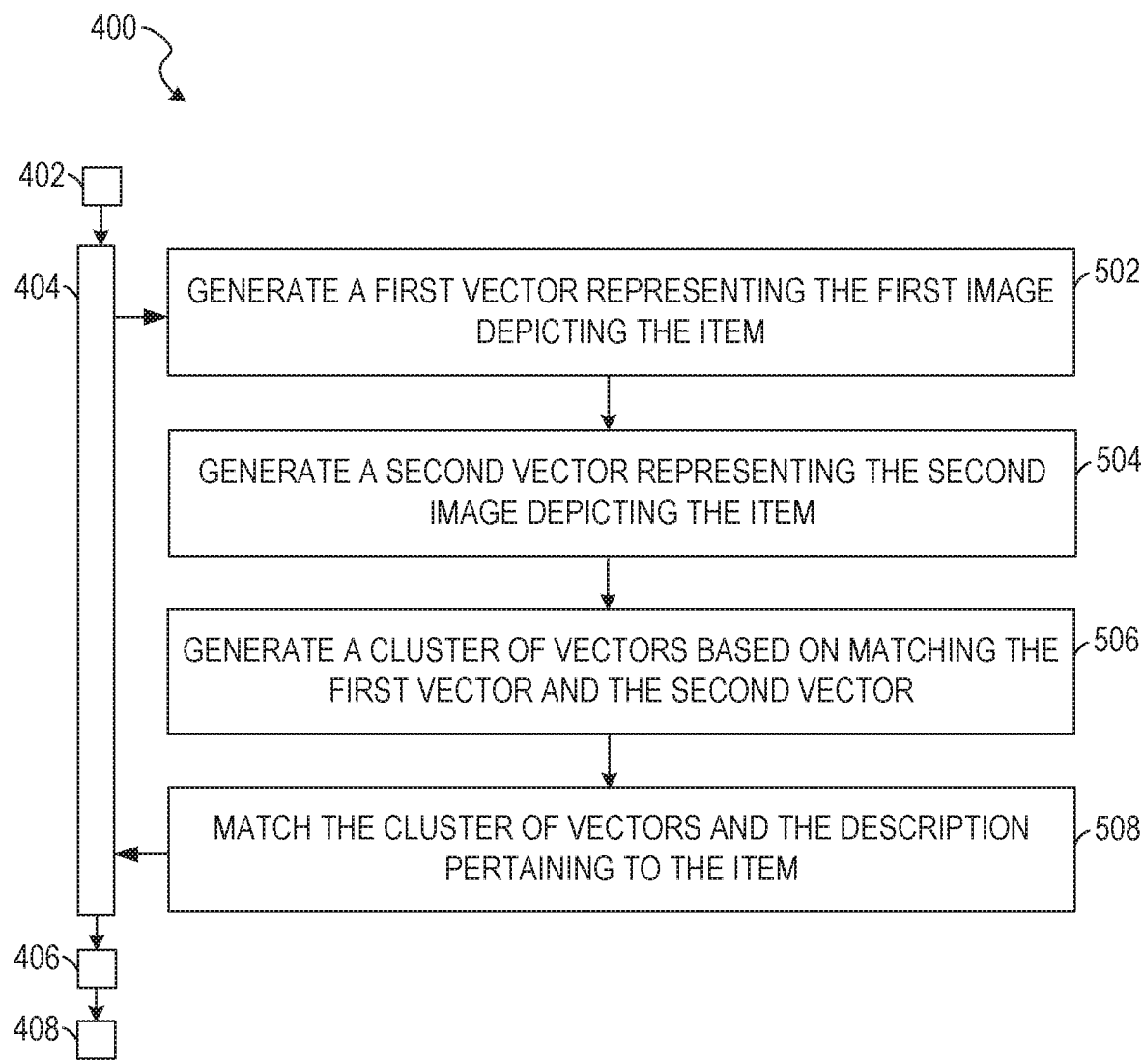
FIG. 5 is a flow diagram illustrating a method for automatically generating a collection of item listings, and representing operation 404 of the method illustrated in FIG. 4 in more detail, according to some example embodiments.
Figure 6:
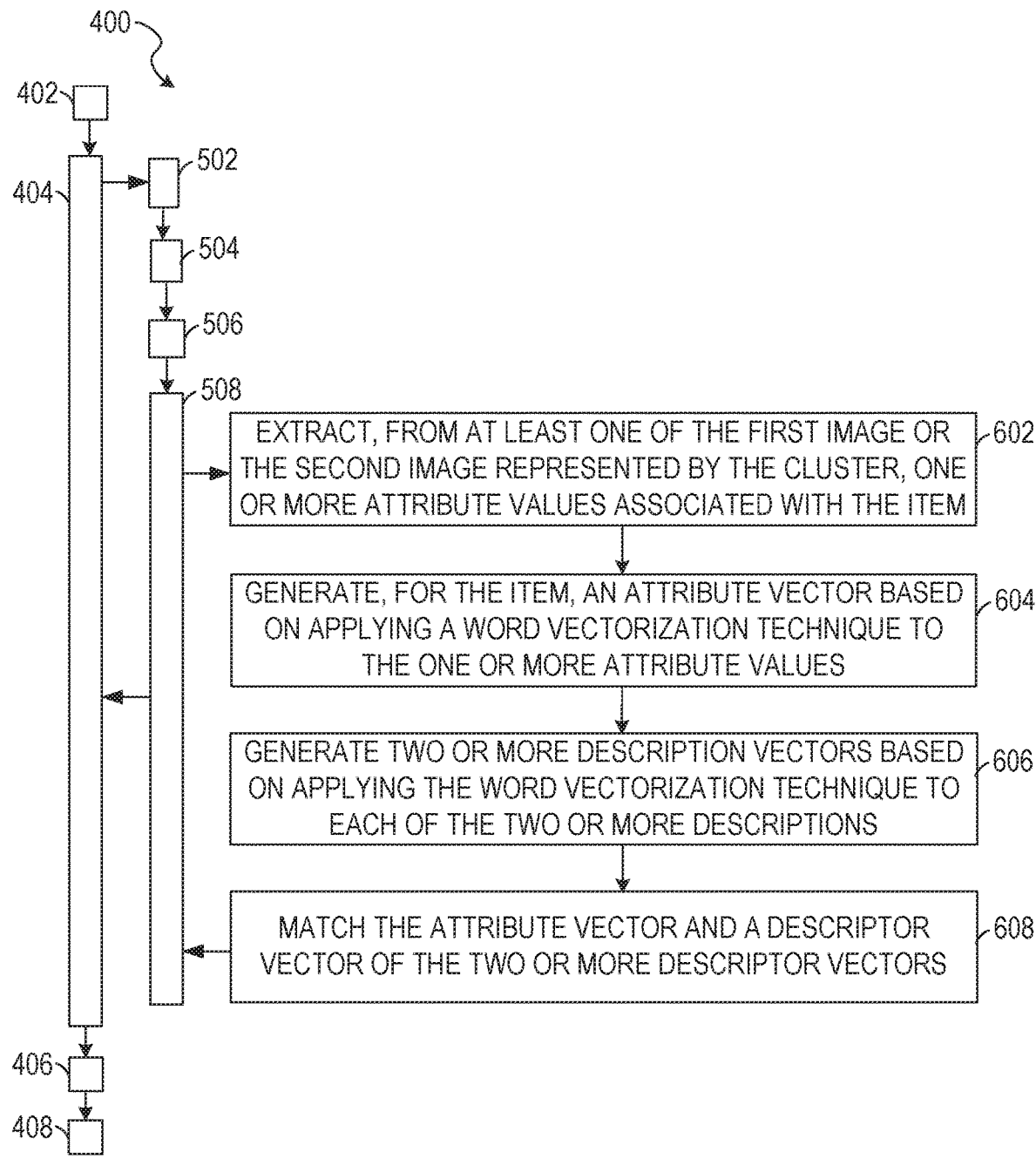
FIG. 6 is a flow diagram illustrating a method for automatically placing an order for a consumable item, and representing operation 508 of the method illustrated in FIG. 5 in more detail, according to some example embodiments.

FIGS. 4-6 are flowcharts illustrating a method for automatic listing generation for multiple items based on joint matching of images of the items and descriptions of the items, according to some example embodiments. Operations in method 400 illustrated in FIG. 4 may be performed using modules described above with respect to FIG. 3. As shown in FIG. 4, method 400 may include one or more of method operations 402, 404, 406, and 408, according to example embodiments.

At operation 402, the access module 302 receives, from a client device, a plurality (e.g., two or more) images and a plurality (e.g., two or more) descriptions. The two or more images depict two or more items, and the two or more descriptions pertain to the two or more items. In some example embodiments, a number of the plurality of images depict a first item (e.g., a pair of blue jeans), and another number of the plurality of images depict a second item (e.g., a yellow t-shirt). In some example embodiments, a first item is depicted in one image of the plurality of images, and a second item is depicted in several images of the plurality of images.

In some example embodiments, an image includes (e.g., is) a photograph of an item, and a description includes (e.g., is) a title. The title may include one or more keywords that describe the item.

In some example embodiments, the plurality of images and the plurality of descriptions are received from the client device of a seller. The seller may provide a batch of unlabeled images and a file that includes a group of descriptions as input to the listing generating system 300 for automatic matching of images of an item with the description of the item, and for automatic generation of a listing of the item based on the automatically matched images of the item and the description of the item. In some example embodiments, the two or more images depicting the two or more items are unlabeled, unordered, and included in a file. In some example embodiments, the two or more descriptions pertaining to the two or more items are unlabeled and included in a file (e.g., a spreadsheet).

At operation 404, the matching module 304 matches one or more images of the two or more images to a description of the two or more descriptions. The one or more images depict an item of the two or more items. The description pertains to the item.

At operation 406, the generating module 306 generates a listing of the item based on the matching of the one or more images to a description. The listing includes the one or more images depicting the item, and the description pertaining to the item.

At operation 408, the presentation module 308 causes display of the listing of the item in a user interface of a client device. The causing display is performed in response to the generating of the listing of the item by the generating module 306. In some instances, the client device is associated with the seller. The seller can verify that the automatically generated listing is correct, and can provide confirmation to the listing generating system 300 that the automatically generated listing for the item is correct. The verification or confirmation may be performed, by the seller, via a selection of a user interface element of the user interface.

Further details with respect to the method operations of method 400 are described below with respect to FIGS. 5 and 6.

As shown in FIG. 5, method 400 includes one or more of operations 502, 504, 506, and 508, according to some embodiments. A first image and a second image of the two or more images may depict the item. Operation 502 may be performed as part (e.g., a precursor task, a subroutine, or a portion) of operation 404, in which the matching module 304 matches one or more images of the two or more images to a description of the two or more descriptions.

At operation 502, the matching module 304 generates, using an image embedding technique, a first vector (e.g., a numeric or feature vector) representing the first image depicting the item. A vector may include various features that represent various aspects of the image. At operation 504, the matching module 304 generates, using the image embedding technique, a second vector representing the second image depicting the item.

At operation 506, the matching module 304 generates a cluster of vectors based on matching the first vector and the second vector. In some example embodiments, the generating of the cluster of vectors based on the matching of the first vector and the second vector includes: generating a plurality of pairs of vectors based on the two or more images depicting two or more items; for each pair of vectors of the plurality of pairs of vectors, determining, using a distance function, a distance value between the vectors included in the pair; determining that the distance value for a pair of vectors that includes the first vector and the second vector is below a threshold value; and grouping the first vector and the second vector in the cluster of vectors based on the determining that the distance value for the pair of vectors that includes the first vector and the second vector is below the threshold value.

At operation 508, the matching module 304 matches the cluster of vectors and the description pertaining to the item.

As shown in FIG. 6, method 400 includes one or more of operations 602, 604, 606, and 608, according to some embodiments. Operation 602 may be performed as part (e.g., a precursor task, a subroutine, or a portion) of operation 508, in which the matching module 304 matches the cluster of vectors and the description pertaining to the item.

At operation 602, the matching module 304 extracts, from at least one of the first image or the second image represented by the cluster, one or more attribute values associated with the item. In some example embodiments, the listing generating system 300 runs Artificial Intelligence (AI) Visual Search and Recognition models for each image to extract attributes values that describe the image depicted in the image. The listing generating system 300 can train computer models to recognize various types of clothing (e.g., jeans) and to output a set of keywords based on analysis of an image. For example, the input is an image of jeans. The listing generating system 300 identifies other images of jeans based on visual matching. In some example embodiments, the attributes include keywords extracted from listings associated with the output images.

At operation 604, the matching module 304 generates, for the item, an attribute vector. The attribute vector may be generated based on applying a word vectorization technique to the one or more attribute values associated with the item.

At operation 606, the matching module 304 generates two or more description vectors based on applying the word vectorization technique to each of the two or more descriptions pertaining to the two or more items.

At operation 608, the matching module 304 matches the attribute vector and a descriptor vector of the two or more descriptor vectors using a bipartite matching algorithm. The bipartite matching algorithm performs pairwise comparisons among two or more attribute vectors associated with the two or more items, and the two or more of description vectors. The two or more attribute vectors include the attribute vector generated for the item.

In some example embodiments, the cluster includes three or more images depicting the item. The listing generating system 300 may select, from the one or more attribute values, an attribute value based on the attribute value being extracted from a majority of the three or more images depicting the item. The generating, for the item, of the attribute vector is based on the applying of the word vectorization technique to the attribute value selected based on the attribute value being extracted from the majority of the three or more images depicting the item. For example, if the attribute value "blue" is extracted based on two of three images of a blue shirt, and the attribute value "green" is extracted based on the third image of the three images of the blue shirt, the listing generating system 300 selects the attribute value "blue" (e.g., extracted from the majority of the three images) for use in the generating of the attribute vector.

In certain example embodiments, when the listing generating system 300 extracts attribute values, the attribute values extracted from the images of an item may include an attribute value that is not represented by a keyword among the keywords included in the description of the item. For example, the title of an item includes the keywords "New green t-shirt." The brand of the t-shirt is Adidas, but the title does not include the keyword "Adidas." The listing generating system 300 can determine, based on matching the three-stripe pattern representing the brand "Adidas" in the images to a database-stored pattern that indicates the Adidas brand, that the brand is Adidas, and can provide the attribute value in the automatically generated listing. The seller can confirm the brand and indicate that the attribute value should be used as a keyword in the description included in the listing.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 7:
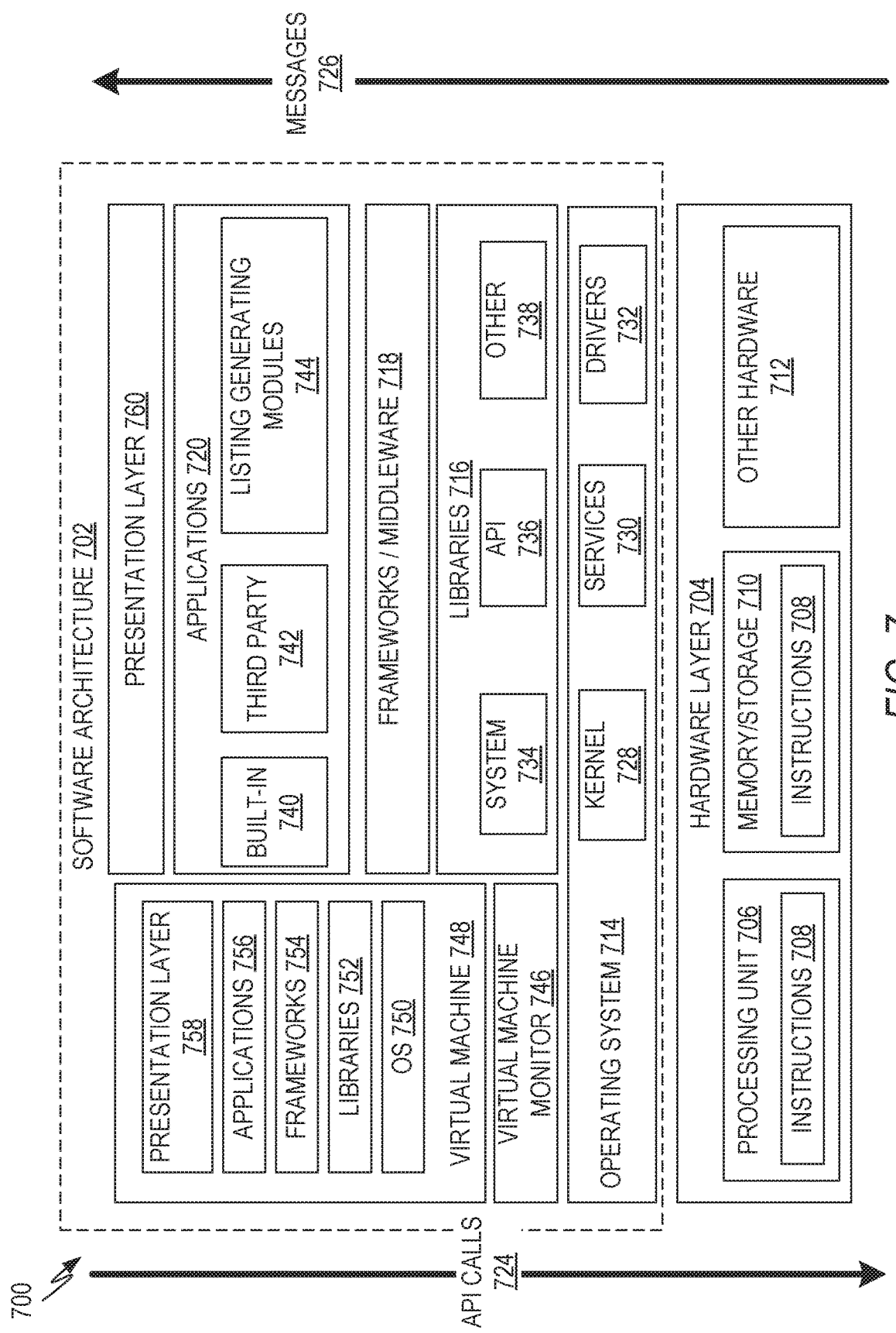
FIG. 7 is a block diagram illustrating an example of a software architecture that may be installed on a machine, according to some example embodiments.
Figure 8:
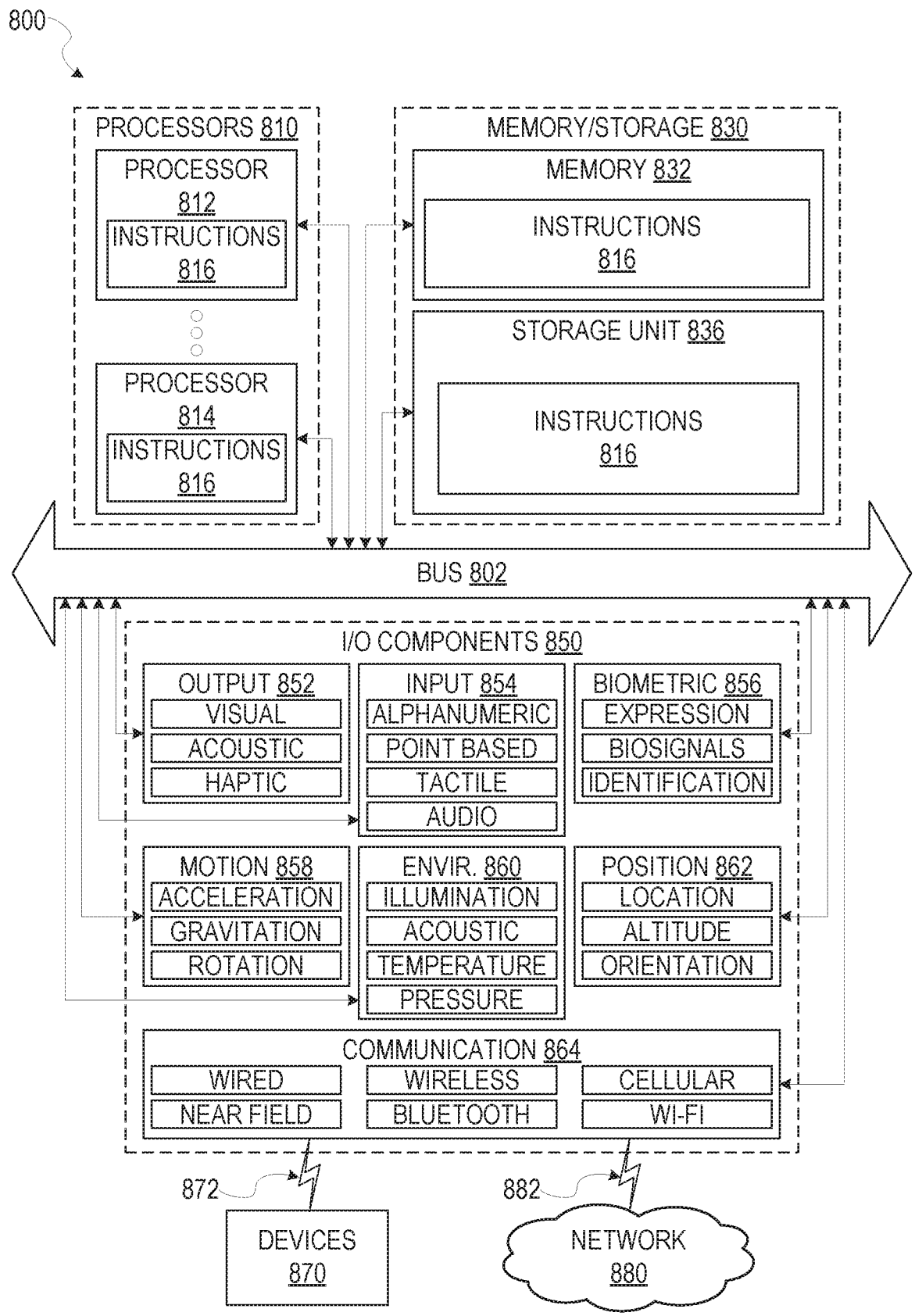
FIG. 8 illustrates a diagrammatic representation of a machine in the form of a computer system within which a set of instructions may be executed for causing the machine to perform any one or more of the methodologies discussed herein, according to an example embodiment.

The modules, methods, applications and so forth described in conjunction with FIGS. 7 and 8 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

FIG. 7 is a block diagram 700 illustrating a representative software architecture 702, which may be used in conjunction with various hardware architectures herein described. FIG. 7 is merely a non-limiting example of a software architecture and it will be appreciated that many other architectures may be implemented to facilitate the functionality described herein. The software architecture 702 may be executing on hardware such as machine 800 of FIG. 8 that includes, among other things, processors 810, memory 830, and I/O components 850. A representative hardware layer 704 is illustrated and can represent, for example, the machine 800 of FIG. 8. The representative hardware layer 704 comprises one or more processing units 706 having associated executable instructions 708. Executable instructions 708 represent the executable instructions of the software architecture 702, including implementation of the methods, modules and so forth of FIGS. 1-6. Hardware layer 704 also includes memory and/or storage modules 710, which also have executable instructions 708. Hardware layer 704 may also comprise other hardware as indicated by 712 which represents any other hardware of the hardware layer 704, such as the other hardware illustrated as part of machine 800.

In the example architecture of FIG. 7, the software 702 may be conceptualized as a stack of layers where each layer provides particular functionality. For example, the software 702 may include layers such as an operating system 714, libraries 716, frameworks/middleware 718, applications 720 and presentation layer 760. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature, and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740, third party applications 742, and listing generating modules 744 (e.g., access module 302, matching module 304, generating module 306, or presentation module 308). Examples of representative built-in applications 740 may include, but are not limited to, a contacts application, a browser application, a book reader application, a location application, a media application, a messaging application, and/or a game application. Third-party applications 742 may include any of the built-in applications as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 760. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware machine (such as the machine of FIG. 8, for example). A virtual machine is hosted by a host operating system (operating system 714 in FIG. 8) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756, and/or presentation layer 758. These layers of software architecture executing within the virtual machine 748 can be the same as corresponding layers previously described or may be different.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions may cause the machine to execute the flow diagrams of FIGS. 4-6. Additionally, or alternatively, the instructions may implement the access module 302, the identifying module 304, the analysis module 306, the ordering module 308, and the presentation module 310. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 812 and processor 814 that may execute instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting an NFC beacon signal that may indicate a particular location, and so forth.

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Executable Instructions and Machine-Storage Medium

The various memories (i.e., 830, 832, and/or memory of the processor(s) 810) and/or storage unit 836 may store one or more sets of instructions and data structures (e.g., software) 816 embodying or utilized by any one or more of the methodologies or functions described herein. These instructions, when executed by processor(s) 810 cause various operations to implement the disclosed embodiments.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method comprising:
receiving, from a client device, multiple images depicting two or more items and two or more descriptions pertaining to the two or more items;
extracting, using one or more machine learning models, two or more words from three or more images of the multiple images, the three or more images depicting an item of the two or more items, the two or more words describing attributes associated with the item depicted in the three or more images;
selecting one or more words from the two or more words based on the one or more words being extracted from a majority of the three or more images depicting the item;
generating an attribute vector by applying a word vectorization technique to the one or more words;
generating two or more description vectors by applying the word vectorization technique to the two or more descriptions;
matching the attribute vector to a description vector of the two or more description vectors based on comparisons between the attribute vector and the two or more description vectors, the description vector corresponding to a description pertaining to the item;
generating, responsive to the matching, a listing of the item, the listing including the three or more images and the description; and
causing display of the listing of the item in a user interface.

2. The method of claim 1, wherein the three or more images include a first image depicting the item and a second image depicting the item, and wherein the extracting includes:
generating, using an image embedding technique, a first vector representing the first image, and a second vector representing the second image;
generating a cluster of vectors by matching the first vector and the second vector; and
extracting at least one word from both the first image and the second image included in the cluster of vectors, the attribute vector generated by applying the word vectorization technique to the at least one word extracted from both the first image and the second image.

3. The method of claim 2, wherein the generating the cluster of vectors includes:
generating a plurality of pairs of vectors based on the multiple images depicting the two or more items;
for each pair of vectors of the plurality of pairs of vectors, determining, using a distance function, a distance value between the vectors included in each pair;
determining that the distance value for a pair of vectors that includes the first vector and the second vector is below a threshold value; and
grouping the first vector and the second vector in the cluster of vectors based on the pair of vectors that includes the first vector and the second vector being below the threshold value.

4. The method of claim 1, wherein the matching the attribute vector to the description vector includes using a bipartite matching algorithm that performs pairwise comparisons on two or more attribute vectors associated with the two or more items and the two or more description vectors, the two or more attribute vectors including the attribute vector generated for the item.

5. The method of claim 1, wherein the multiple images depicting the two or more items are unlabeled, unordered, and included in a file.

6. The method of claim 1, wherein the two or more descriptions pertaining to the two or more items are unlabeled and included in a file.

7. The method of claim 1, wherein the two or more words include an additional word having been extracted from less than the majority of the three or more images depicting the item, the attribute vector generated by applying the word vectorization technique to the one or more words and not the additional word.

8. The method of claim 1, wherein generating the listing includes automatically adding, to the description, a word of the two or more words extracted from the three or more images, the word previously excluded from the description.

9. A system comprising:
one or more hardware processors; and
a machine-readable medium for storing instructions that, when executed by the one or more hardware processors, cause the one or more hardware processors to perform operations comprising:
receiving, from a client device, multiple images depicting two or more items and two or more descriptions pertaining to the two or more items;
extracting, using one or more machine learning models, two or more words from three or more images of the multiple images, the three or more images depicting an item of the two or more items, the two or more words describing attributes associated with the item depicted in the three or more images;
selecting one or more words from the two or more words based on the one or more words being extracted from a majority of the three or more images depicting the item;
generating an attribute vector by applying a word vectorization technique to the one or more words;
generating two or more description vectors by applying the word vectorization technique to the two or more descriptions;
matching the attribute vector to a description vector of the two or more description vectors based on comparisons between the attribute vector and the two or more description vectors, the description vector corresponding to a description pertaining to the item;

generating, responsive to the matching, a listing of the item, the listing including the three or more images and the description; and causing display of the listing of the item in a user interface.

10. The system of claim 9, wherein the three or more images include a first image depicting the item and a second image depicting the item, and wherein the extracting includes:
   generating, using an image embedding technique, a first vector representing the first image, and a second vector representing the second image;
   generating a cluster of vectors by matching the first vector and the second vector; and
   extracting at least one word from both the first image and the second image included in the cluster of vectors, the attribute vector generated by applying the word vectorization technique to the at least one word extracted from both the first image and the second image.

11. The system of claim 10, wherein the generating the cluster of vectors includes:
   generating a plurality of pairs of vectors based on the multiple images depicting the two or more items;
   for each pair of vectors of the plurality of pairs of vectors, determining, using a distance function, a distance value between the vectors included in each pair;
   determining that the distance value for a pair of vectors that includes the first vector and the second vector is below a threshold value; and
   grouping the first vector and the second vector in the cluster of vectors based on the pair of vectors that includes the first vector and the second vector being below the threshold value.

12. The system of claim 9, wherein the matching the attribute vector to the description vector includes using a bipartite matching algorithm that performs pairwise comparisons on two or more attribute vectors associated with the two or more items and the two or more description vectors, the two or more attribute vectors including the attribute vector generated for the item.

13. The system of claim 9, wherein the multiple images depicting the two or more items are unlabeled, unordered, and included in a first file, and the two or more descriptions pertaining to the two or more items are unlabeled and included in a second file.

14. The system of claim 9, wherein the two or more words include an additional word having been extracted from less than the majority of the three or more images depicting the item, the attribute vector generated by applying the word vectorization technique to the one or more words and not the additional word.

15. A non-transitory machine-readable medium comprising instructions, which when executed by one or more hardware processors, cause the one or more hardware processors to perform operations comprising:
   receiving, from a client device, multiple images depicting two or more items and two or more descriptions pertaining to the two or more items;
   extracting, using one or more machine learning models, two or more words from three or more images of the multiple images, the three or more images depicting an item of the two or more items, the two or more words describing attributes associated with the item depicted in the three or more images;
   selecting one or more words from the two or more words based on the one or more words being extracted from a majority of the three or more images depicting the item;
   generating an attribute vector by applying a word vectorization technique to the one or more words;
   generating two or more description vectors by applying the word vectorization technique to the two or more descriptions;
   matching the attribute vector to a description vector of the two or more description vectors based on comparisons between the attribute vector and the two or more description vectors, the description vector corresponding to a description pertaining to the item;
   generating, responsive to the matching, a listing of the item, the listing including the three or more images and the description; and
   causing display of the listing of the item in a user interface.

16. The non-transitory machine-readable medium of claim 15, wherein the three or more images include a first image depicting the item and a second image depicting the item, and wherein the extracting includes:
   generating, using an image embedding technique, a first vector representing the first image, and a second vector representing the second image;
   generating a cluster of vectors by matching the first vector and the second vector; and
   extracting at least one word from both the first image and the second image included in the cluster of vectors, the attribute vector generated by applying the word vectorization technique to the at least one word extracted from both the first image and the second image.

17. The non-transitory machine-readable medium of claim 16, wherein the generating the cluster of vectors includes:
   generating a plurality of pairs of vectors based on the multiple images depicting the two or more items;
   for each pair of vectors of the plurality of pairs of vectors, determining, using a distance function, a distance value between the vectors included in each pair;
   determining that the distance value for a pair of vectors that includes the first vector and the second vector is below a threshold value; and
   grouping the first vector and the second vector in the cluster of vectors based on the pair of vectors that includes the first vector and the second vector being below the threshold value.

18. The non-transitory machine-readable medium of claim 15, wherein the matching the attribute vector to the description vector includes using a bipartite matching algorithm that performs pairwise comparisons on two or more attribute vectors associated with the two or more items and the two or more description vectors, the two or more attribute vectors including the attribute vector generated for the item.

19. The non-transitory machine-readable medium of claim 15, wherein the multiple images depicting the two or more items are unlabeled, unordered, and included in a first file, and wherein the two or more descriptions pertaining to the two or more items are unlabeled and included in a second file.

20. The non-transitory machine-readable medium of claim 15, wherein the two or more words include an additional word having been extracted from less than the majority of the three or more images depicting the item, the attribute vector generated by applying the word vectorization technique to the one or more words and not the additional word.

\* \* \* \* \*